Figure 1:
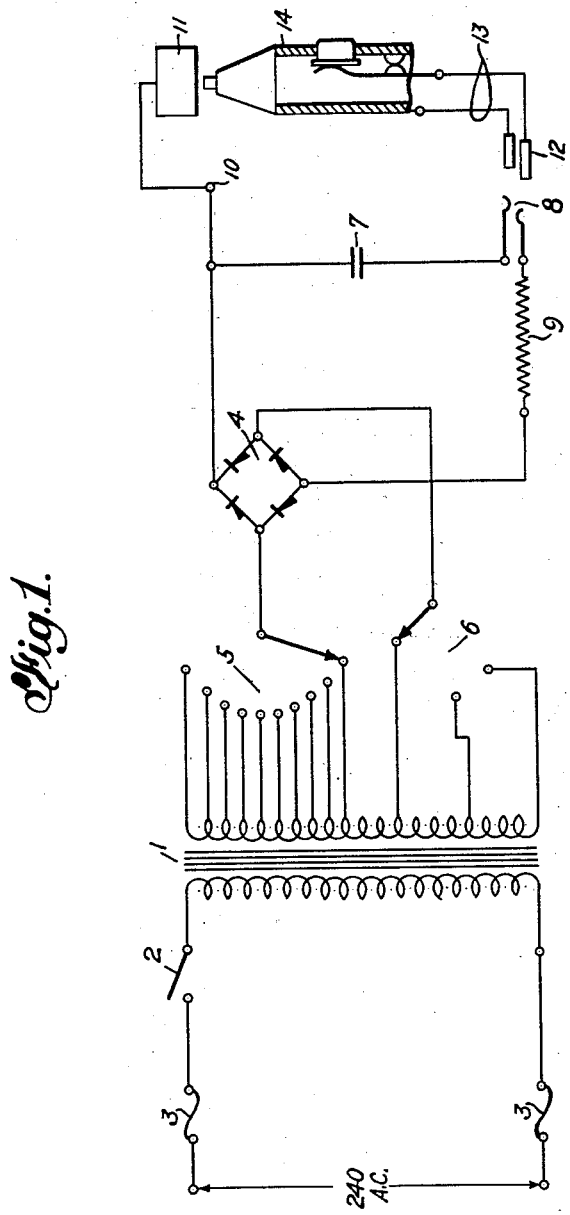

June 6, 1950 G. GILLIVER 2,510,099
WELDING EQUIPMENT
Filed Oct. 22, 1946 2 Sheets-Sheet 1

INVENTOR
GILBERT GILLIVER
BY
ATTORNEY

June 6, 1950  G. GILLIVER  2,510,099
WELDING EQUIPMENT
Filed Oct. 22, 1946  2 Sheets-Sheet 2
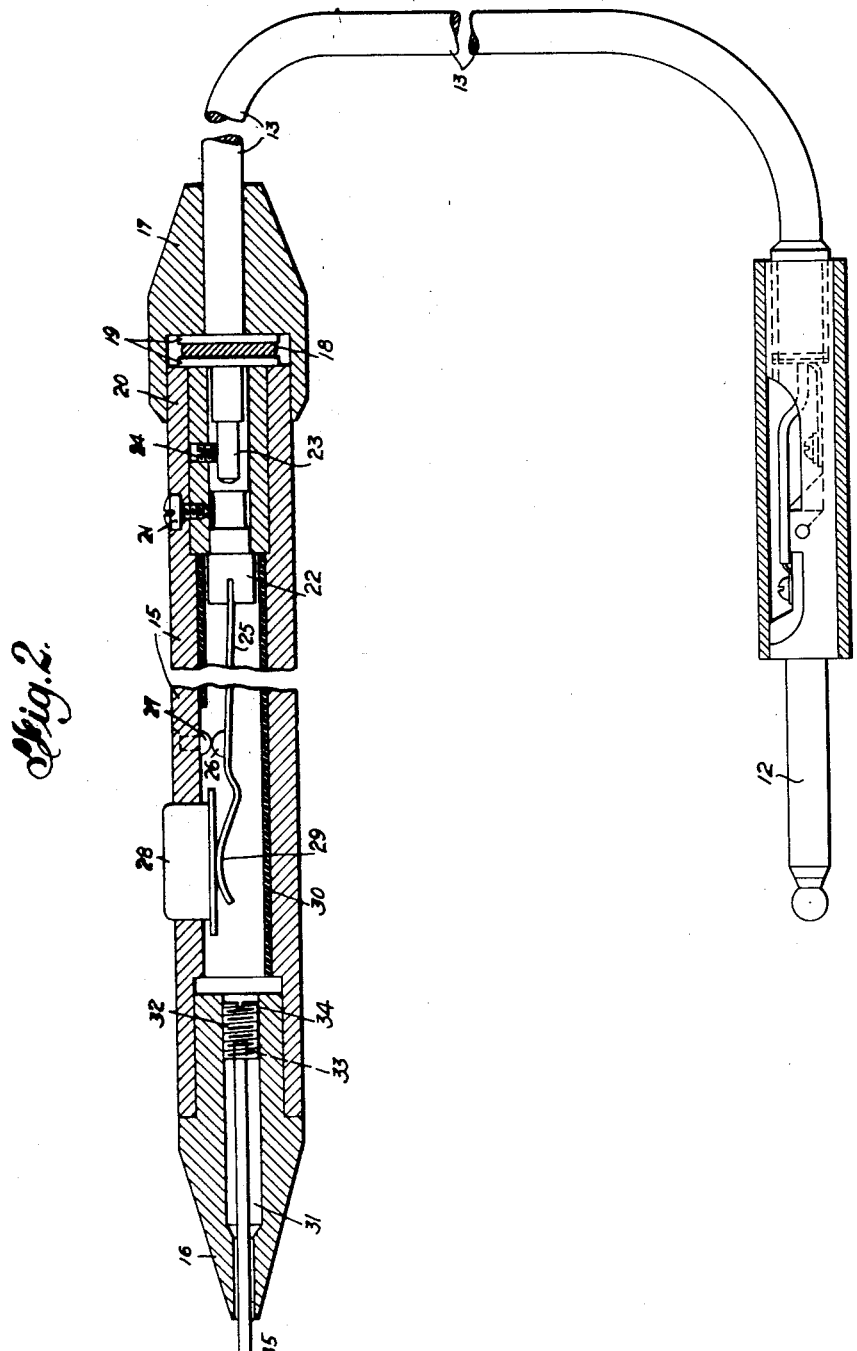
INVENTOR
GILBERT GILLIVER
BY
ATTORNEY Patented June 6, 1950

2,510,099

UNITED STATES PATENT OFFICE 2,510,099

WELDING EQUIPMENT

Gilbert Gilliver, London, England, assignor to International Standard Electric Corporation, New York, N. Y.

Application October 22, 1946, Serial No. 704,969
In Great Britain August 2, 1945

Section 1, Public Law 690, August 8, 1946
Patent expires August 2, 1965

3 Claims. (Cl. 219—4)

This invention relates to electrical welding equipment, particularly applicable to the welding of wires, strands, tapes, tags or any combination of these forms of conductors used in electrical circuits.

My United States patent application No. 554,368, filed Sept. 16, 1944 describes a method whereby a more exact control of welding can be exercised by the provision of a predetermined amount of electrical energy from an electric capacity discharged through the work and an electrode in contact with the work, at the moment of weld.

In the equipment therein described the electrode for holding the work to be welded is described as a clamp and a second electrode is moved forward to come into contact with the work to be welded, thereby discharging through the work the electrical energy stored in the capacity. We have found that this arrangement of electrodes is not suitable for every kind of work. Thus not all work to be welded by the means described in my aforesaid application can be fitted conveniently into a clamp electrode, nor is it always possible to make electrically sound welds in confined spaces, or in positions only accessible through restricted apertures.

The object of the present invention is to provide equipment suitable for such purposes.

According to one feature of the invention a fuse welding equipment of the type in which discharge of electrical energy stored in an electric capacity effects welding comprises a pencil-like tool, having an electrode capable of being propelled forward as it is consumed in the process of welding, penetrable to perform welding operations in confined spaces or through restricted apertures.

The pencil-like tool preferably comprises connections for a two-conductor wire or cable and manually operable contacts for the control of condenser charging and discharging circuits through the wire or cable.

The nature of the invention will be understood from the following description of one embodiment thereof in conjunction with the accompanying drawings in which:

Fig. 1 is a circuit diagram of a fuse welding equipment according to the invention Fig. 2 is a longitudinal view of the pencil-like tool.

Referring first to Fig. 1, the welding equipment comprises a transformer 1, the primary of which is connected through a control switch 2 and fuses 3 to an A. C. source which may be 200/250 volts. Opposite terminals of a full-wave rectifier 4 are connected via fine (e. g. 10-tap) and coarse (e. g. 3-tap) control switches 5 and 6 across the two ends of the transformer secondary, while the other two terminals of the rectifier are connected via a 2000 µf. electrolytic condenser 7 and a 10-ohm resistance 9 to a telephone type two point jack 8.

The connection between the rectifier and the condenser is also connected to an equipment terminal 10 to which is connected the work to be fused 11.

A two-point plug 12 connected by a two conductor cable 13 to the pencil-like electrode holder 14 is adapted to be inserted in the equipment jack 8. The cable has a centre conductor, inner insulation, metal screen, and outer insulation.

Referring now to Fig. 2, the electrode holder consists of a cylindrical metal case 15 screwed internally at one end to take a conical electrode-carrying cap 16, and screwed externally at the other end to take a metal cap 17 which clamps the metal screen 18 of the cable 13 between two metal washers 19 making contact with the case 15 through the metal cap 17.

An insulating bush 20 is fixed by a locating screw 21 in the cable end of the casing 15.

A metal terminal 22 journalled on the bush 20 has a hollow rear portion 23 to receive the bared end of the central cable conductor fixed therein by a set screw 24.

A metal spring 25 carried by the metal terminal 22 extends lengthwise of, and within the casing 15, a contact 26 carried thereby normally resting on an internal casing contact 27. An insulated button 28 is mounted in an aperture in the casing to bear upon the free end 29 of the contact spring 25.

A thin piece of insulating material 30 is wrapped round the inside of the metal casing 15 to prevent the spring 25 touching the metal casing when the button 28 is depressed to break the two contacts 26, 27.

The conical cap 16 has an axial bore 31 of small diameter opened out and threaded at the rear to receive a grub screw 32.

The grub-screw 32 has a hole 33 drilled in the end opposite to the screw-driver slot 34 into which a rod electrode 35 of small diameter is fixed by any suitable means such as soldering, making an electrode assembly which can be propelled like a pencil-lead by means of the grub-screw 32 and the internal thread of the conical cap 16. The purpose of this feature is to enable the electrode 35 to be advanced as it wears and to be replaced when necessary.

Different caps carrying different sizes of electrodes of either carbon or tungsten or other suitable material may be provided.

When a weld is to be made, the plug 12 is inserted in the jack 8, the power switch 2 is closed and the pencil is held in the hand with the button 28 in the normal position. These operations charge the condenser 7. The button 28 on the pencil is then depressed, thus opening the condenser charging circuit and preparing a condenser discharge circuit which is completed through the work to be welded by touching the point at which the weld is required with the pencil electrode 35.

The pencil electrode can be inserted into confined spaces or through restricted apertures to make welds.

What is claimed is:

1. A fuse welding equipment of the type in which discharge of electrical energy stored in an electrical capacitor effects welding, comprising a hollowed, pencil-like tool, an electrode disposed coaxially within the pointed end of said tool and projecting longitudinally therefrom, means within said tool for propelling said electrode longitudinally, a pair of normally closed electrical contacts within said tool, and means to open said contacts, said last named means extending through the periphery of said tool.

2. A fuse welding equipment as claimed in claim 1, wherein the means within said tool for propelling said electrode comprises a grub screw, said screw being threadedly engaged with the inside of the tip of said tool, said electrode being attached at one end thereof to one end of said screw.

3. A fuse welding equipment as claimed in claim 1, said tool further comprising connections for a two-conductor electric wire or cable, and means for connecting said wire or cable to an electrical capacitor and its associated charging apparatus.

GILBERT GILLIVER.

REFERENCES CITED

The following references are of record in the file of this patent:

UNITED STATES PATENTS

| Number | Name | Date |
|---|---|---|
| 1,618,383 | Lloyd | Feb. 22, 1927 |
| 2,005,752 | Pfanstiehl | June 25, 1935 |